United States Patent [19]

Nelson

[11] Patent Number: 5,906,384
[45] Date of Patent: May 25, 1999

[54] CART SYSTEM FOR MOVING PRODUCT

[75] Inventor: Roger D. Nelson, Rice Lake, Wis.

[73] Assignee: F/G Products, Inc., Rice Lake, Wis.

[21] Appl. No.: 08/735,618

[22] Filed: Oct. 23, 1996

[51] Int. Cl.⁶ .......................................................... B62B 3/14
[52] U.S. Cl. ................ 280/79.11; 280/408; 280/33.998
[58] Field of Search ................... 296/3, 36; 280/33.998, 280/79.11, 79.3, 408, 411.1, 412; 414/788.3

[56] References Cited

U.S. PATENT DOCUMENTS

| | | |
|---|---|---|
| 818,257 | 4/1906 | Kennedy . |
| 1,966,751 | 7/1934 | Brefeld .............................. 280/79.11 X |
| 2,791,463 | 5/1957 | Levitt ........................................ 296/28 |
| 2,827,302 | 3/1958 | Skyrud ............................. 280/79.11 X |
| 2,876,927 | 3/1959 | Henning .................................... 220/63 |
| 3,628,805 | 12/1971 | Archer ................................ 280/33.998 |
| 3,711,148 | 1/1973 | Hindin ................................... 296/28 M |
| 3,908,562 | 9/1975 | Wittschen ............................. 280/79.11 |
| 4,127,202 | 11/1978 | Jennings et al. ..................... 280/408 X |
| 4,186,845 | 2/1980 | Podd ........................................ 220/461 |
| 4,232,612 | 11/1980 | Winsor ..................................... 105/423 |
| 4,399,737 | 8/1983 | Severson ......................................... 98/6 |
| 4,420,183 | 12/1983 | Sherman .................................. 296/181 |
| 4,512,591 | 4/1985 | Plante ................................ 280/79.11 X |
| 4,687,215 | 8/1987 | Brendgord et al. ................. 280/79.1 R |
| 5,185,980 | 2/1993 | Rydberg et al. ........................... 52/506 |

FOREIGN PATENT DOCUMENTS

| | | | |
|---|---|---|---|
| 0047706 A2 | 3/1982 | European Pat. Off. | .......... B62K 7/04 |
| 0 309 058 A2 | 9/1988 | European Pat. Off. | .......... B62B 3/00 |
| 1422668 | 11/1965 | France | ................. 280/79.11 |
| 1003844 | 8/1996 | Netherlands | ...................... B62B 3/00 |
| 510351 | 7/1939 | United Kingdom . | |
| 1595691 | 8/1981 | United Kingdom | .............. B62B 3/00 |
| 2246552 | 2/1992 | United Kingdom | .............. B60P 1/02 |
| 2265603 | 10/1993 | United Kingdom | .............. 280/33.998 |

OTHER PUBLICATIONS

Solid Style Refrigerator Bulkhead, Aero Industries, Inc. Indianapolis, IN, pp. 1–6, 1994.

*Primary Examiner*—J. J. Swann
*Assistant Examiner*—Michael Mar
*Attorney, Agent, or Firm*—Chapman and Cutler

[57] ABSTRACT

The present invention provides a cart system for moving product from one point to another. The system includes at least one inner cart and at least one outer cart. The outer cart includes a gate for receiving the inner cart and also includes couplers for coupling a plurality of outer carts in tandem.

14 Claims, 8 Drawing Sheets

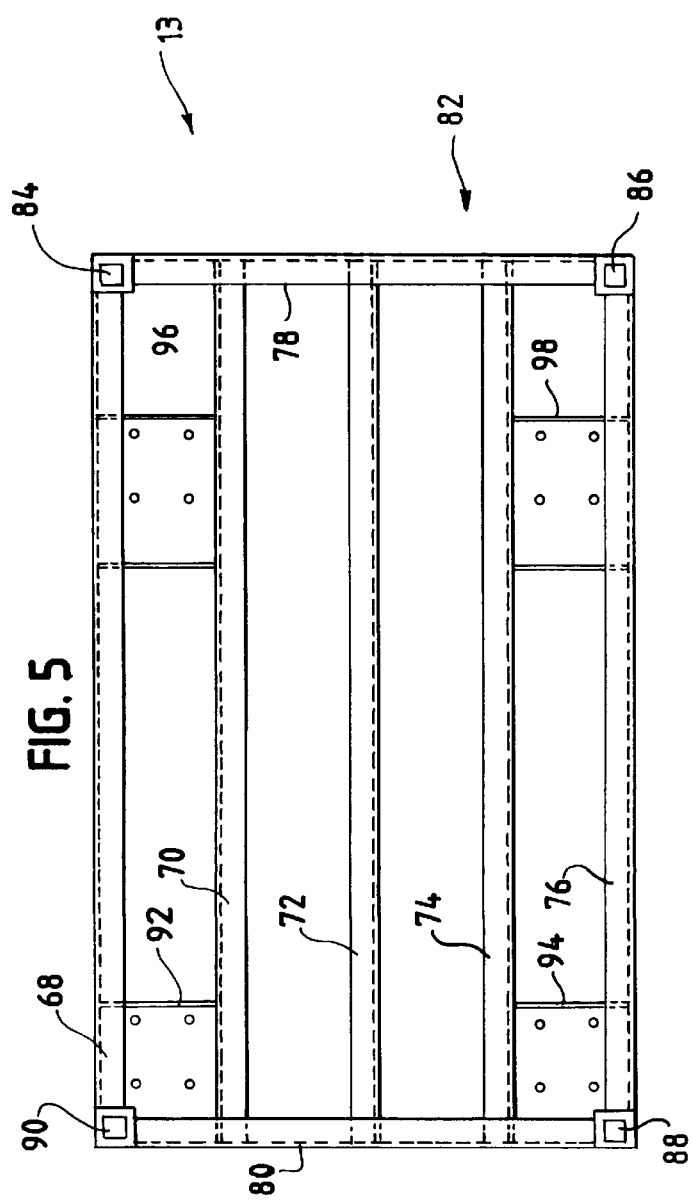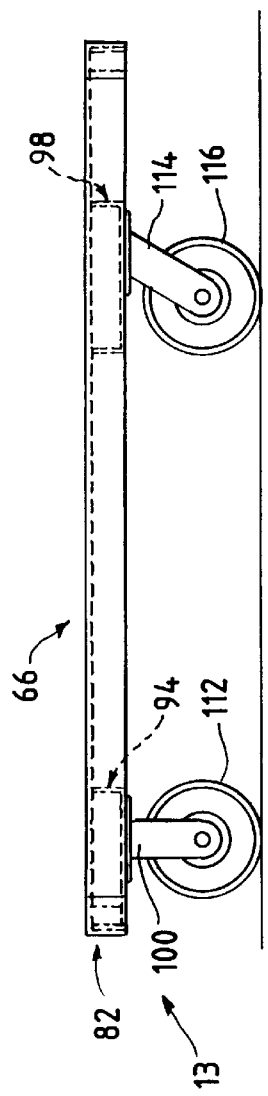

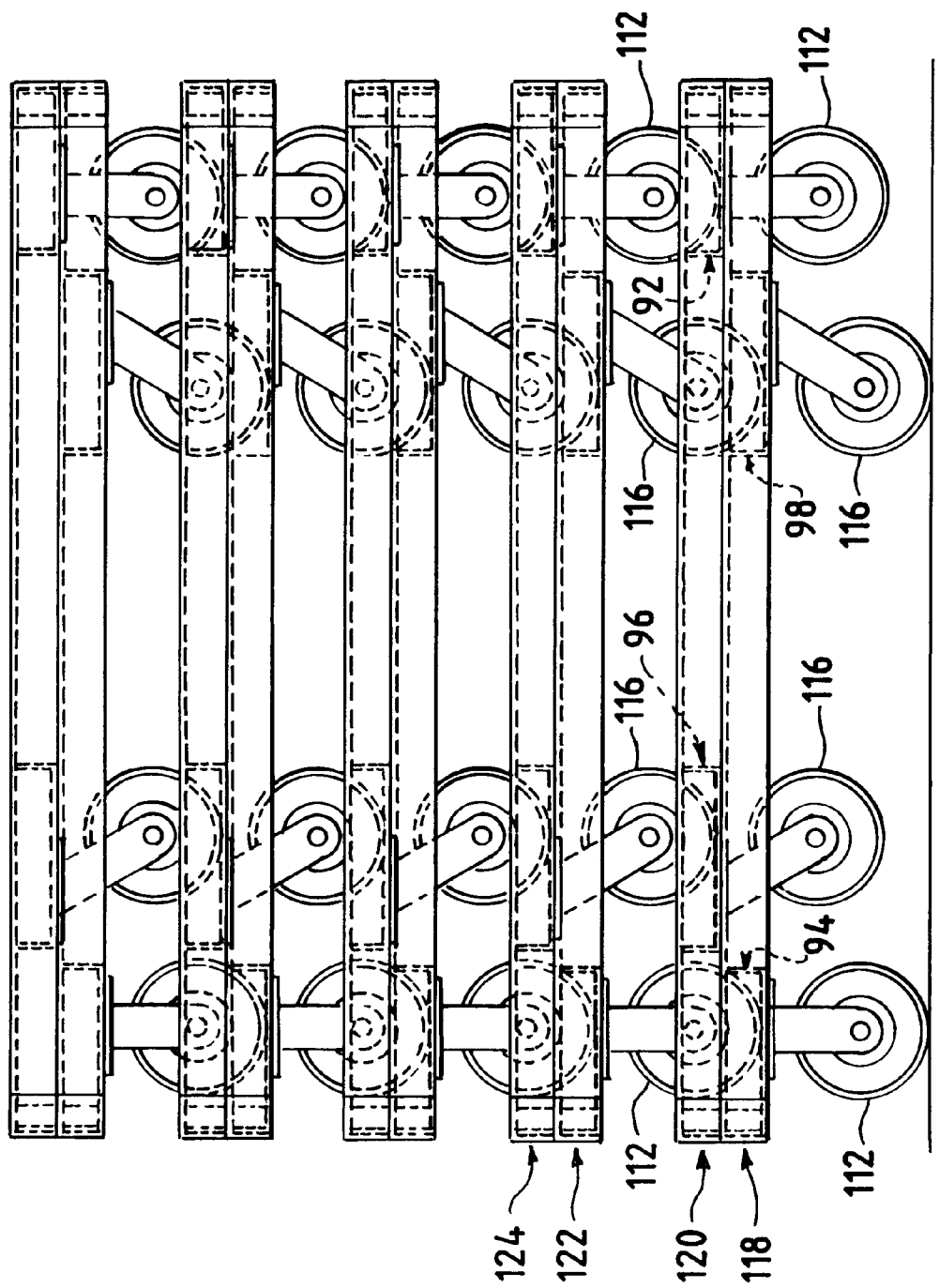

CART SYSTEM FOR MOVING PRODUCT

TECHNICAL FIELD OF THE INVENTION

This invention relates to a system of carts for moving product from one point to another. In particular, the system is used in the food industry and consists of carts used for both loading product at a warehouse and shipping the product to its destination.

BACKGROUND ART

The shipping process used by the food industry, as well as other industries, includes heavy duty carts with couplers that enable the carts to be joined in tandem Product may be stored in a warehouse covering a great expanse. When an order comes in from a buyer, a warehouse worker will pick the order; i.e., move about the numerous aisles of the warehouse obtaining each of the items and quantities listed in the order.

So as to economize the efforts of the worker, several orders from one or more buyers may be picked simultaneously by the worker. The worker will move about the warehouse with several carts coupled together, depending on the size and number of the orders. The carts may be pulled by a fork lift or the like. Each cart is usually loaded only with product to be delivered to the same destination.

After the orders have been picked, the carts are loaded onto a shipping means such as a trailer. Upon reaching the delivery destination, the carts are used to transport the product throughout the delivery destination for unloading. The empty carts are loaded back onto the trailer and returned to the warehouse.

The problems presented by this shipping process are that the shipping means has both weight and space limitations, yet the carts must be constructed with sufficient size and weight to pull heavy product loads about the warehouse. Additionally, many delivery destinations have space limitations which make it difficult to maneuver the carts when the product is being unloaded. Moreover, the coupling mechanisms of the carts are subject to being damaged during the delivery phase, and as a result require frequent maintenance.

For the foregoing reasons, there is a need for a product delivery system that is compact, is light weight, and requires low-maintenance.

SUMMARY OF THE INVENTION

It is an object of the present invention to increase the space and weight available for product on the shipping means.

It is a further object of the present invention to make it easier to move carts and product about the delivery destination.

It is yet a further object of the present invention to reduce the cost of acquiring and maintaining a product delivery system.

Other objects and features will become apparent in the course of a detailed description of the invention.

The present invention for a system of carts for delivering product from one point to another includes outer carts with couplers for coupling to other outer carts and vehicles. The outer carts enclose inner carts that are void of couplers. The outer carts are designed to bear the pulling weight of the system when the product is moved both about the warehouse and to the shipping means. The inner carts serve as the base for supporting product Two braces attach to the ends of each inner cart and align and stabilize the product while it is on the inner cart. A removable shelf attaches to the two braces to provide an additional support for product. A removable handle may be attached to the inner cart to assist in transporting the inner cart once it has been removed from the outer cart.

Because the outer carts bear the bulk of the pulling force when multiple outer carts are coupled in tandem, each inner cart need only support its own product load, and therefore can be made of lighter weight material than the outer carts. Additionally, the inner carts are lighter as they do not include couplers. Because of the inner carts' lighter weight, more product can be loaded onto the inner carts without exceeding the weight limits of the shipping means.

In addition, since the inner carts are constructed without the bulkiness and couplers of the prior art carts, the inner carts not only require less shipping space, but also can be manufactured less expensively. The outer carts of the present invention are of heavy duty construction and have couplers. These outer carts, however, remain in the warehouse while the inner carts are shipped with the product to the product destination, thereby allowing a single outer cart to service multiple inner carts. Using fewer of the outer carts reduces the total cost of the cart system. Additionally, because only the outer carts have couplers, using fewer outer carts also reduces the total number of couplers subject to maintenance.

The braces and their attached shelves can be removed from the inner carts after the product has been delivered. The inner carts then can be stacked on top of one another for compact storage and transport back to the warehouse. The removable shelves may also be stacked with the inner carts and may be modified to include recesses to receive the legs of another shelf when stacking.

BRIEF DESCRIPTION OF THE DRAWINGS

FIG. 5 is a top view of the inner cart of the present invention.

FIG. 6 is a side view of the inner cart of FIG. 5.

FIG. 7 is a side view of the inner carts of the present invention in a stacked arrangement.

DETAILED DESCRIPTION

Figure 1:
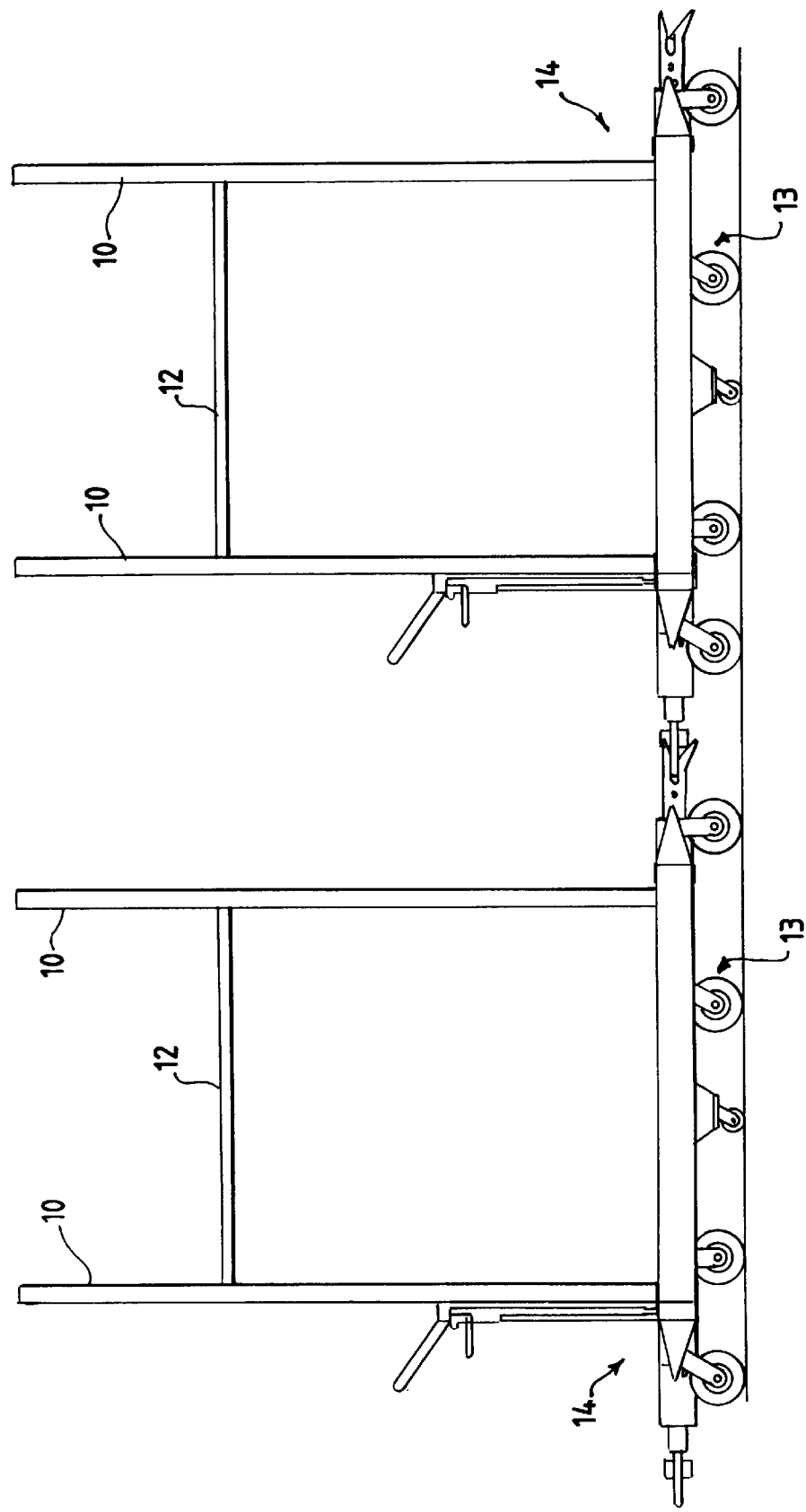
FIG. 1 is a side view of the system of carts of the present invention.

FIG. 1 is a side view of the system of carts of the present invention. In FIG. 1 two braces 10 and a support shelf 12 are mounted on an inner cart 13 which is enclosed by an outer cart 14.

Figure 2:
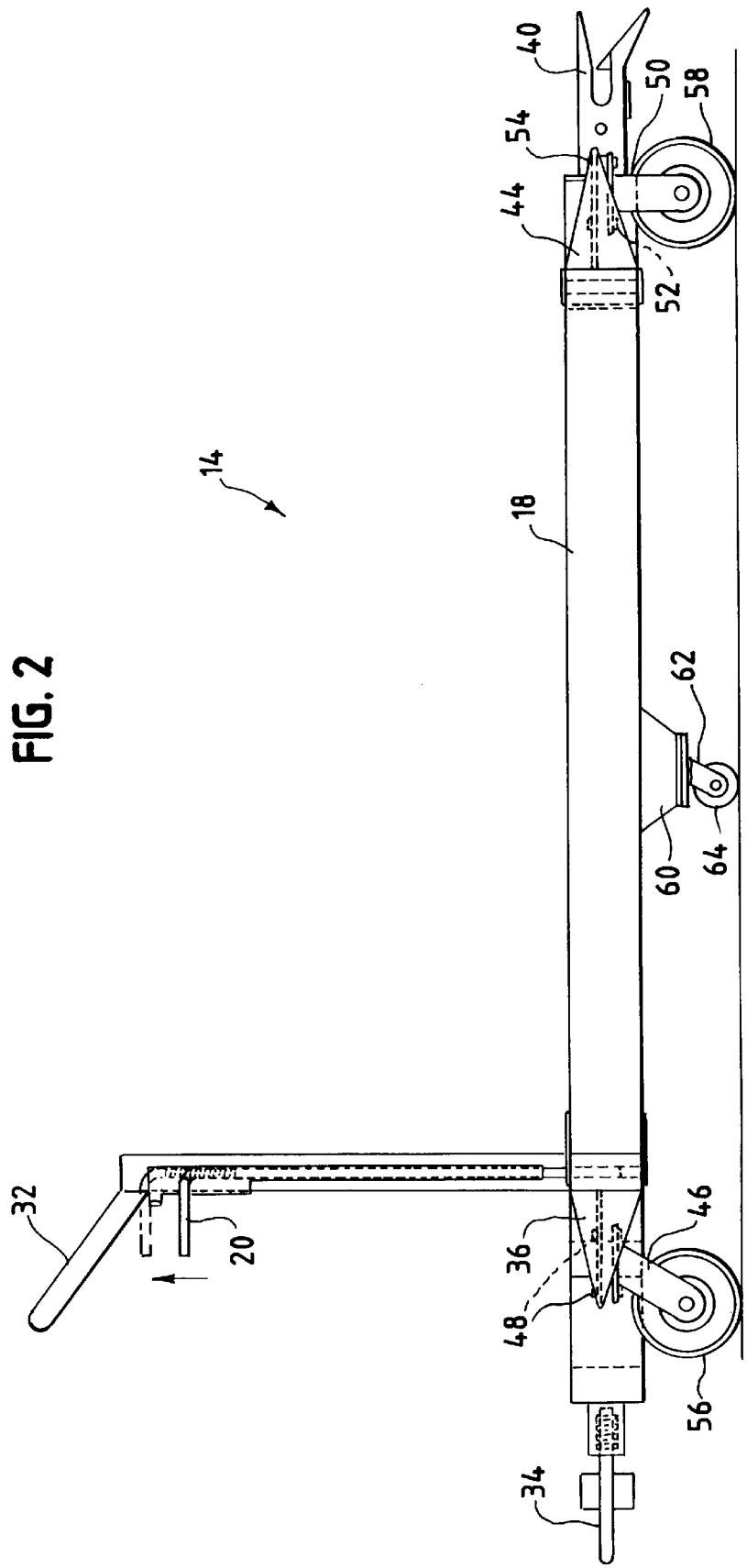
FIG. 2 is a side view of the outer cart of the present invention.
Figure 3:
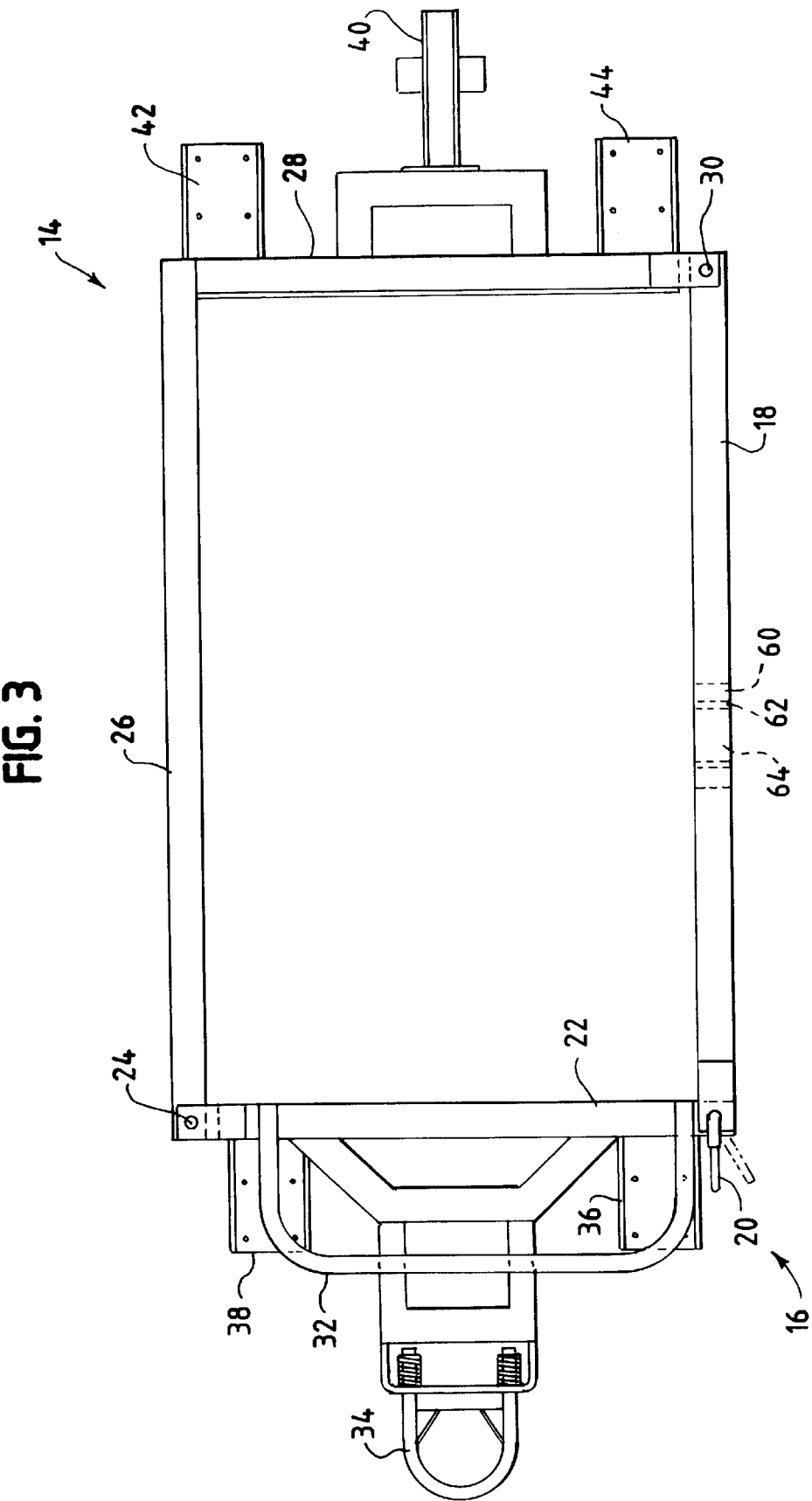
FIG. 3 is a top view of the outer cart of FIG. 2 in the closed position.
Figure 4:
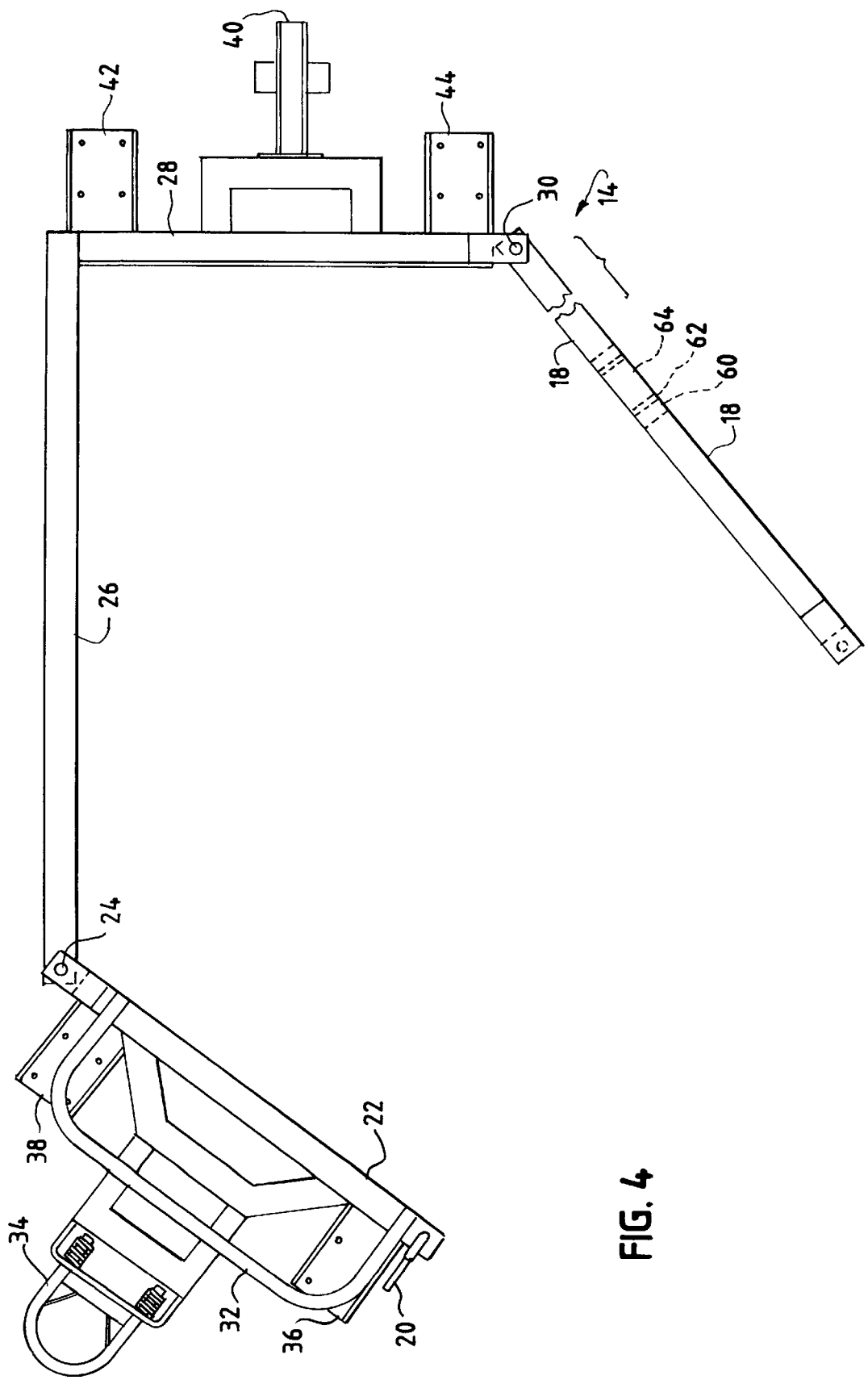
FIG. 4 is a top view of the outer cart of FIG. 2 in the open position.

FIG. 2 is a side view of the preferred embodiment of the outer cart 14 of the present invention. FIG. 3 is a top view of the outer cart 14 of FIG. 2. The outer cart 14 includes a gate 16 as described below. FIG. 4 is a top view of the outer cart 14 of FIG. 2 with the gate 16 in the open position. In FIG. 3 the first side 18 is secured by a bar 20 to the first end 22. The first end 22 is pivotally connected by a hinge pin 24 to a second side 26. The second side 26 is connected to a second end 28. The second end 28 is pivotally connected to the first side 18 by a hinge pin 30. Mounted on top of the first end 22 is an upright handle 32. The upright handle 32 is used to pull the outer cart 14 when the outer cart 14 is not coupled to another vehicle. Attached to the outside of the first end 22 and extending outward in the horizontal plane is a coupler 34. Also attached to the outside of the first end 22 on either side of the coupler 34 are wheel brackets 36 and 38. Attached to the outside of the second end 28 and extending outward in the horizontal plane is a spring-loaded coupler 40. Also attached to the outside of the second end 28 on either side of the spring-loaded coupler 40 are wheel brackets 42 and 44. The first end 22, second end 28, first side 18, and second side 26 are each L-shaped and may be made of material such as aluminum or plastic. The first end 22, second end 28, first side 18, and second side 26 form a bottomless frame with an interior space having a perimeter. In FIG. 2 it can be seen that the bar 30 is a hand-operated lever which is raised and turned to disconnect the first side 18 from the first end 22. In FIG. 4 it can be seen that when disconnected, the first side 18 can pivot outward on hinge pin 30 and the first end 22 can pivot outward on hinge pin 24, thereby opening the outer cart 14.

In FIG. 2 it can be seen that the wheel bracket 36 is connected to a swivel base 46 by bolts 48. Wheel bracket 38, hidden in FIG. 2, is also connected to a swivel base 46 by bolts 48. In FIG. 2 it can be seen that the wheel bracket 44 is connected to a fixed base 50 by bolts 52 and 54. Wheel bracket 42, hidden in FIG. 2, is also connected to a fixed base 50 by bolts 52 and 54. Wheel brackets 36, 38, 42, and 44 are used to attach wheels 56 and 58 to the bottomless frame via bases 46 and 50. Wheels 56 and 58 mobilize the outer cart. In FIG. 2 it can be seen that the first side 18 is connected to a bracket 60. Bracket 60 is connected to side swivel wheel base 62. Side swivel wheel base 62 is connected to side wheel 64. Side wheel 64 is smaller than the wheels 56 and 58, and is used to pivot and support the first side 18 when the gate 16 of the outer cart 14 is opened.

FIG. 5 is a top view of a preferred embodiment of the inner cart 13 of the present invention. FIG. 6 is a side view of the inner cart 13 of FIG. 5. FIG. 7 is a side view of a plurality of the inner cart 13 of FIG. 5 in a stacked arrangement. In FIG. 5 it can be seen that support bars 68, 70, 72, 74, and 76 are positioned parallel to one another. A connector bar 78 is connected to the end of each support bar 68, 70, 72, 74, and 76. A connector bar 80 is connected to the other end of each support bar 68, 70, 72, 74, and 76. The connector bars 78 and 80 and the support bars 68, 70, 72, 74, and 76 form a support platform 82. The support platform 82 can be made of material such as aluminum or plastic, and is used to support product on the inner cart 13. A recess 84 is formed at the corner where support bar 68 and connector bar 78 meet. A recess 86 is formed at the corner where support bar 76 and connector bar 78 meet A recess 88 is formed at the corner where support bar 76 and connector bar 80 meet. A recess 90 is formed at the corner where support bar 68 and connector bar 80 meet. A recessed wheel bracket plate 92 is connected to support bars 68 and 70, and to connector bar 80. A recessed wheel bracket plate 94 is connected to support bars 74 and 76, and to connector bar 80. Plates 94 and 92 are flat with one upright edge. The ends of the upright edge of plate 92 connect to support bars 68 and 70, and the opposite edge connects to the connector bar 80. The ends of the upright edge of plate 94 connect to support bars 74 and 76, and the opposite edge connects to the connector bar 80.

A recessed wheel bracket plate 96 is connected to support bars 68 and 70, and a recessed wheel bracket plate 98 is connected to support bars 74 and 76. Recessed plates 96 and 98 are U-shaped, having a flat bottom and two upright edges. The ends of each upright edge of plate 96 connect to support bars 68 and 70. The ends of each upright edge of plate 98 connect to support bars 74 and 76. In FIG. 6 it can be seen that plate 94 is connected to a fixed base 100 by a suitable means such as bolts (not shown), and that fixed base 100 is connected to a wheel 112. Similarly, plate 92 is connected by bolts (not shown) or other suitable means to a fixed base 100 which is connected to a wheel 112. Plate 98 is connected to a swivel base 114 by a suitable means such as bolts (not shown), and swivel base 114 is connected to a wheel 116. Plate 96 is connected by bolts (not shown) or other suitable means to a swivel base 114 which is connected to a wheel 116. Plates 96, 98, 94, and 92 are used to connect wheels 112 and 116 to the support platform 82 via the respective fixed bases 100 and swivel bases 114.

FIG. 7 discloses a plurality of identical inner carts 13 in a stacked arrangement. Each inner cart in FIG. 7 is assigned a unique reference numeral. The inner carts are stacked by aligning the connector bar 78 of inner cart 118 with the connector bar 80 of an adjacent inner cart 120 so that the support platforms 82 of adjacent inner carts 118 and 120 are flush. The connector bar 78 of inner cart 122 is aligned with the connector bar 78 of inner cart 118 both so that the wheels 112 of inner cart 122 rest on the plates 94 and 92 of inner cart 118, and so that the wheels 116 of inner cart 122 rest on the plates 96 and 98 of inner cart 118. The connector bar 78 of inner cart 124 is aligned with the connector bar 78 of inner cart 120 so that the wheels 112 of inner cart 124 rest on the plates 94 and 92 of inner cart 120, and so that the wheels 116 of inner cart 124 rest on the plates 96 and 98 of inner cart 120. Aligning connector bar 78 of inner cart 124 with the connector bar 78 of inner cart 120 also allows the support platforms 82 of inner carts 122 and 124 to rest flush against one another.

On the inner cart 13, the support bars 68 and 70 are spaced apart a distance greater than the width of each base 100 and 114. This spacing arrangement allows wheels 112 and 116 to be suspended between the support bars 68 and 70 during the stacking arrangement Similarly, the support bars 74 and 76 are spaced wider than each of the bases 100 and 114. Plates 96 and 98 are positioned relative to connector bar 78 so that the edge of the connector bar 78 is spaced from the closest edge of the plates 96 and 98 a distance roughly equal to the length of plates 94 and 92. In FIG. 7 it can be seen that this spacing arrangement enables the fixed bases 100 of inner cart 120 to be suspended between the connector bar 78 of inner cart 118 and plates 96 and 98 of inner cart 118 when the inner carts 118 and 120 are stacked.

Figure 8:
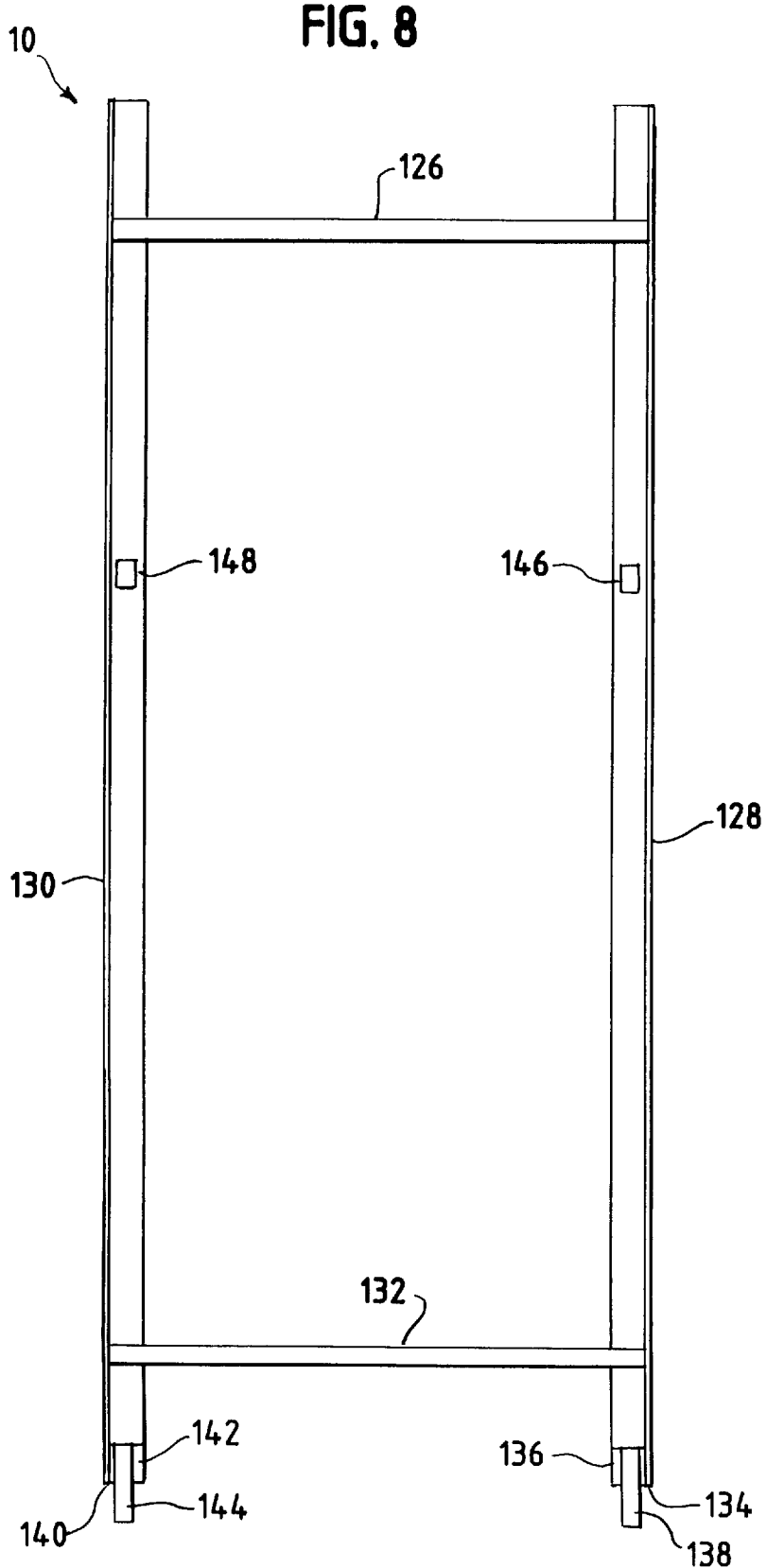
FIG. 8 is a plan view of the brace of the present invention.

FIG. 8 is a plan view of the preferred embodiment of the brace 10 of the present invention. In FIG. 8 it can be seen that a horizontal bar 126 is secured to upright bars 128 and 130. In FIG. 8 it also can be seen that a horizontal bar 132 is secured to upright bars 128 and 130. Straps 134 and 136 secure leg 138 to the bottom of upright bar 128. Straps 140 and 142 secure leg 144 to the bottom of upright bar 130. A bracket 146 is secured to upright bar 128. A bracket 148 is secured to upright bar 130. The brace 10 may be made of aluminum, plastic or other suitable material. Upright bars 128 and 130 are L-shaped. The legs 138 and 144 are used to mount the brace 10 on the inner cart 13 and are sized to fit any of recesses 84, 86, 88, and 90 of the inner cart 13 shown in FIG. 5. Two braces 10 are used for each inner cart 13. Each brace 10 is mounted on the inner cart 13 by fitting legs 138 and 144 into either recesses 84 and 86 or recesses 88 and 90. The brace 10 may be removed from the inner cart 13 by lifting the brace 10 so that legs 138 and 144 are removed from either recesses 84 and 86 or recesses 88 and 90.

Figure 9:
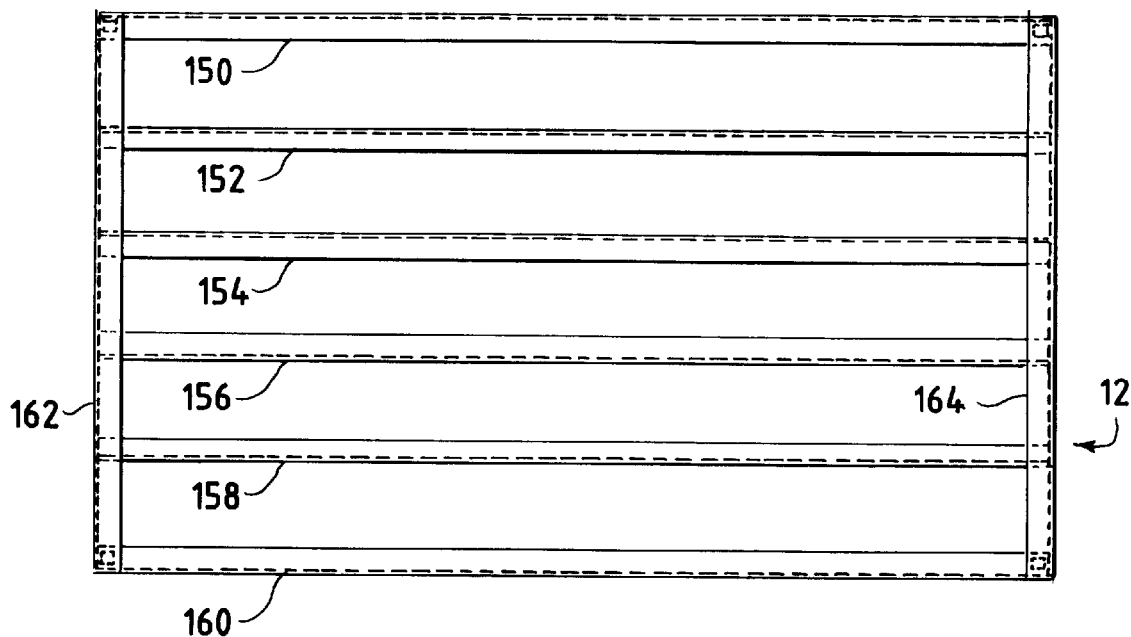
FIG. 9 is a top view of the support shelf of the present invention.
Figure 10:
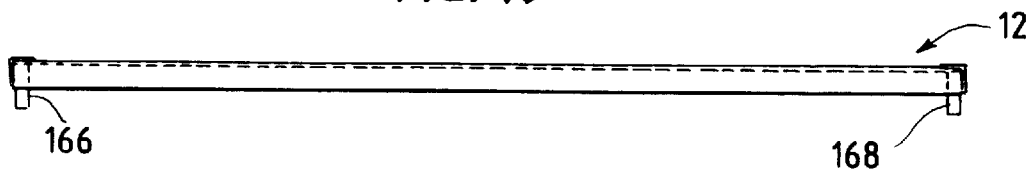
FIG. 10 is a side view of the support shelf of FIG. 9.

FIG. 9 is a top view of the preferred embodiment of the support shelf 12 of the present invention. FIG. 10 is a side view of the support shelf 12 of FIG. 9. In FIG. 9 it can be seen that shelf-support bars 150, 152, 154, 156, 158, and 160 are positioned parallel to one another. A bar 162 is connected to the end of each shelf-support bar 150, 152, 154, 156, 158, and 160. A bar 164 is connected to the other end of each shelf-support bar 150, 152, 154, 156, 158, and 160. In FIG. 10 it can be seen that a leg 166 is connected at the corner where shelf-support bar 160 and bar 162 meet. A leg 166 is also connected at the corner where shelf-support bar 150 and bar 162 meet. A leg 168 is connected at the corner where shelf-support bar 160 and bar 164 meet. A leg 168 is connected at the corner where shelf-support bar 150 and bar 164 meet The shelf-support bars 150, 152, 154, 156, 158, and 160 the bars 162 and 164, and the legs 166 and 168 form the support shelf 12. When two of the braces 10 are mounted on an inner cart 13, the support shelf 12 can be connected to the braces 10 to form an additional support for product. The support shelf 12 is connected to the two braces 10 by connecting shelf legs 166 to the first brace 10 brackets 146 and 148, and by connecting shelf legs 168 to the second brace 10 brackets 146 and 148. The support shelf can be removed from the brace 10 by using sufficient force both to disconnect shelf legs 166 from brackets 146 and 148 of the first brace 10, and to disconnect shelf legs 168 from the brackets 146 and 148 of the second brace 10. The support shelf can be made of aluminum, plastic or other suitable material.

I claim:

1. A system for transporting goods from one destination to another, comprising:

at least one inner cart adapted for rolling engagement with a supporting surface and having a frame; and at least one one outer cart adapted for rolling engagement with the supporting surface and having receiving means with a pivotal gate for fully receiving the inner cart therein when the gate is in a closed position to form a unitary cart with both the inner and outer carts in rolling engagement with the supporting surface, said outer cart including a frame having a first frame end, a second frame end, a first frame side, and a second frame side, the frame defining a perimeter within the frame sides and frame ends when the gate is in the closed position, said gate including two gate members, the first frame side having one end pivotally coupled to the second frame end to form a first gate member and the first frame end having one end pivotally coupled to the second frame side to form a second gate member, the second ends of said first frame side and first frame end being releasably coupled to each other by releasable coupling means when the gate members are in the closed position and movable apart when the gate members are pivoted outwardly to an opened position to permit entry of the inner cart into the outer cart.

2. The system of claim 1, wherein the outer cart further includes a first coupler at a first end and a second coupler at a second end.

3. The system of claim 1, further comprising a plurality of wheels mounted to the outer cart frame.

4. The system of claim 3, wherein the plurality of wheels each include a bracket mounted to the frame ends and extending away from the frame.

5. The system of claim 4, further comprising a wheel mounted to the first frame side and located outside of the perimeter.

6. The system of claim 4, wherein the wheels mounted to the first frame end each include a swivel base, and the wheels mounted to the second frame end each include a fixed base.

7. The system of claim 3, wherein the wheels are located outside the perimeter.

8. The system of claim 1, wherein the releasable coupling means includes a hole in the first frame end, a hole in the first frame side, and a pin, whereby the holes are aligned to receive the pin and to releasably couple the first frame end to the first frame side.

9. The system of claim 1, wherein the inner cart further includes a plurality of wheels mounted to the frame.

10. The system of claim 9, wherein the inner cart further comprising a first and second wheel brackets at a first end of the inner cart frame, and a third and fourth wheel brackets at a position inward from a second end of the inner cart frame, each of the brackets is positioned at a bottom of the inner cart frame, each of the plurality of wheels mounted to a respective bracket, and at least two of the wheels include a swivel base.

11. The system of claim 10, wherein the inner cart further includes at least one removable support shelf and means for receiving and supporting at least one brace.

12. An outer cart adapted for receiving an inner cart, the inner cart for transporting goods from one location to another, the inner and outer carts each being adapted for rolling engagement with a supporting surface, the outer cart having receiving means with a pivotal gate for fully receiving the inner cart therein when the gate is in a closed position to form a unitary cart with both the inner and outer carts in rolling engagement with the supporting surface, the outer cart comprising:

a frame having a first frame end, a second frame end, a first frame side, and a second frame side, the frame defining a perimeter within the frame sides and frame ends when the gate is in the closed position, said gate including two gate members, the first frame side having one end pivotally coupled to the second frame end to form a first gate member and the first frame end having one end pivotally coupled to the second frame side to form a second gate member, the second ends of said first frame side and first frame end being releasably coupled to each other by releasable coupling means when the gate members are in the closed position and movable apart when the gate members are pivoted outwardly to an opened position to permit entry of the inner cart into the outer cart.

13. The outer cart of claim 12, further comprising a plurality of wheels mounted to the outer cart frame, the wheels located outside the perimeter.

14. The outer cart of claim 12, further comprising first and second couplers at first and second ends respectively of the outer cart frame for permitting a plurality of the outer carts to be joined together.

* * * * *